(12) United States Patent
Lo

(10) Patent No.: US 12,184,960 B2
(45) Date of Patent: Dec. 31, 2024

(54) CAMERA HAVING IMAGING LENSES WITH VARIED INTER-LENS SPACINGS

(71) Applicant: Kwok Wah Allen Lo, Causeway Bay (HK)

(72) Inventor: Kwok Wah Allen Lo, Causeway Bay (HK)

( * ) Notice: Subject to any disclaimer, the term of this patent is extended or adjusted under 35 U.S.C. 154(b) by 85 days.

(21) Appl. No.: 17/874,372

(22) Filed: Jul. 27, 2022

(65) Prior Publication Data

US 2024/0040220 A1 Feb. 1, 2024

(51) Int. Cl.
*H04N 23/55* (2023.01)
*G02B 13/00* (2006.01)

(52) U.S. Cl.
CPC ........... *H04N 23/55* (2023.01); *G02B 13/004* (2013.01)

(58) Field of Classification Search
CPC .............................. H04N 23/55; G02B 13/004
See application file for complete search history.

(56) References Cited

U.S. PATENT DOCUMENTS

| | | | | |
|---|---|---|---|---|
| 3,953,869 A * | 4/1976 | Wah Lo | ................. | G02B 30/27 396/327 |
| 4,037,950 A * | 7/1977 | Lo | .......................... | G03B 35/24 396/327 |
| 4,086,585 A * | 4/1978 | Wah Lo | ................. | G03B 35/08 396/326 |
| 4,630,913 A * | 12/1986 | Lo | .......................... | G03B 35/10 396/327 |
| 2017/0358062 A1 * | 12/2017 | Podnar | ................... | H04N 7/183 |
| 2021/0289190 A1 * | 9/2021 | Nims | ................... | H04N 13/398 |
| 2022/0385880 A1 * | 12/2022 | Nims | ................... | H04N 13/239 |

FOREIGN PATENT DOCUMENTS

| | | | | |
|---|---|---|---|---|
| CN | 105869157 B | * | 3/2019 | |
| CN | 114598856 A | * | 6/2022 | |
| WO | WO-2018049698 A1 | * | 3/2018 | ........... H04N 13/243 |
| WO | WO-2021174600 A1 | * | 9/2021 | ............... G06T 7/50 |
| WO | WO-2023177036 A1 | * | 9/2023 | ........... H04N 13/204 |

* cited by examiner

*Primary Examiner* — Michael Lee
(74) *Attorney, Agent, or Firm* — Ware, Fressola, Maguire & Barber LLP

(57) ABSTRACT

A camera has one or more rows of imaging lenses and an imaging sensor to capture a plurality of images formed by the imaging lenses. Each pair of the imaging lenses in a row is separated by an inter-lens spacing and the inter-lens spacing of any one pair of the imaging lenses is different from the inter-lens spacing of another pair. An image selection device is used to select the images formed by two imaging lenses for making a three-dimensional image. The number of the imaging lenses is three or more.

12 Claims, 2 Drawing Sheets

CAMERA HAVING IMAGING LENSES WITH VARIED INTER-LENS SPACINGS

FIELD OF THE INVENTION

The present invention generally relates to a camera having a plurality of imaging lenses for capturing images of the same scene at different viewing angles.

BACKGROUND OF THE INVENTION

Binocular vision provides us with the ability to see depth perception. Depth realization arises from horizontal separation parallax in the eyes. The depth perception can, to some degree, be reproduced in a three dimensional image seen from a 3D display. It is known in the art, that a 3D display consists of a display device and a parallax sheet such as a lenticular screen or a parallax barrier disposed over the display device. The display device, such as an LCD, is used to display a composite image, which is composed of a plurality of left-image strips and right-image strips alternately arranged. The parallax sheet is used to separate the left-image strips from the right-image strips so that the left eye of a viewer can only see the left image and the right eye can only see the right image. To generate the left-right image pair, a camera must have at least two imaging lenses to capture two images at two slightly different viewing angles. The spacing between the two imaging lenses in combination with the distance between the camera and the photographed object generally determines the amount of parallax seen in the 3D display. In a camera where the spacing between the imaging lenses cannot be widely adjusted, it would be difficult to produce the desired amount of parallax when the photographed object is too far or too close from the camera.

SUMMARY OF THE DISCLOSURE

The present invention is directed to a camera having three or more imaging lenses fixedly mounted on the camera body so as to allow a user to effectively select which pair of imaging lenses to be used to take the left-right image pair for producing a composite image to be displayed based on the distance of the photographed object. In an embodiment of the present invention, the inter-lens spacing of any one pair of imaging lenses is different from the inter-lens spacing of another pair of imaging lenses.

It is an aspect of the present invention to provide a camera which comprises:
  N imaging lenses arranged in a row, and
  an imaging sensing device arranged to capture N images, each associated with a different one of the N imaging lenses, wherein each pair of the N imaging lenses is spaced from each other by an inter-lens spacing, and wherein the inter-lens spacing between one pair of the N imaging lenses is different from the inter-lens spacing between another pair of the N imaging lenses, and wherein N is a positive integer equal to or greater than 3.

In an embodiment of the present invention, the camera further comprises:
  a selection device, electronically connected to the imaging sensing device, for selecting two of the N images, and
  an image processor arranged to compose a composite image from said two of the N images.

In an embodiment of the present invention, the camera further comprises:
  a three-dimensional display device electronically connected to the image processor arranged to display the composite image.

In an embodiment of the present invention, each of the imaging lenses has a focal length and the focal length of any one of the imaging lenses is equal to the focal length of another one of the imaging lenses.

In an embodiment of the present invention, the imaging lenses are fixed-focus lenses.

In an embodiment of the present invention, the image lenses are focus-adjustable lenses.

In an embodiment of the present invention, the camera further comprises:
  a ranging device arranged to determine a distance of a photographed object, wherein each of the image lenses has an adjustable focus and the focus is adjusted based on the distance of the photographed object.

In an embodiment of the present invention, the ranging device comprises a laser ranging device.

In an embodiment of the present invention, the imaging sensing device comprises N imaging sensors.

In an embodiment of the present invention, the imaging sensing device comprises one imaging sensor.

In an embodiment of the present invention, the camera further comprises:
  M imaging lenses arranged in a different row, wherein the imaging sensing device is also arranged to capture M images, each of the M images associated with a different one of the M imaging lenses, wherein each pair of the M imaging lenses is spaced from each other by an inter-lens spacing, and wherein the inter-lens spacing between one pair of the M imaging lenses is different from the inter-lens spacing between another pair of M imaging lenses and also different from the inter-lens spacing between any pair of the N imaging lenses, and wherein M is a positive integer equal to or greater than 3.

In an embodiment of the present invention, the camera comprises a mobile device.

In an embodiment of the present invention, the camera comprises a standalone camera.

Another aspect of the present invention is a method for producing a composite image in a camera. The method comprises:
  providing a row of N imaging lenses on the camera,
  arranging an imaging sensing device arranged to capture N images, each associated with a different one of the N imaging lenses, wherein each pair of the N imaging lenses is spaced from each other by an inter-lens spacing, and wherein the inter-lens spacing between one pair of the N imaging lenses is different from the inter-lens spacing between another pair of the N imaging lenses, and wherein N is a positive integer equal to or greater than 3, and
  selecting two of the N images for producing the composite image based on the inter-lens spacing between said two of the N images.

DETAILED DESCRIPTION OF THE INVENTION

Figure 1A:
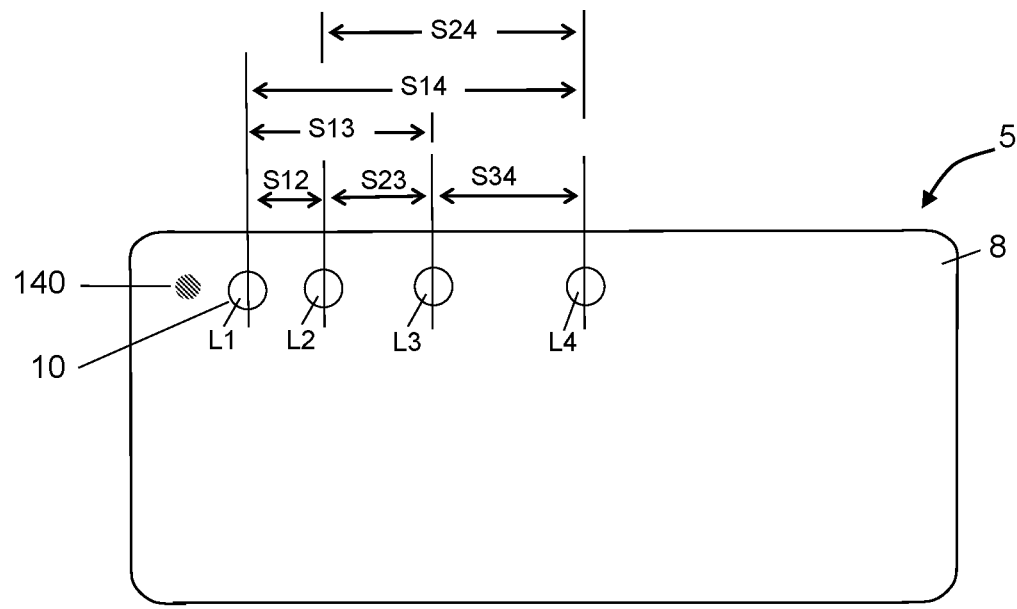
FIG. 1A shows the front view of the camera, according to an embodiment of the present invention.

The present invention is directed to a camera having three or more imaging lenses with the same focal length arranged for forming three or more images on an image sensor device. In an embodiment of the present invention, the camera 5 has four imaging lenses 10 fixedly mounted on the camera body 8. As shown in FIG. 1A, the imaging lenses L1, L2, L3 and L4 are arranged in a row such that the inter-lens spacing between any one pair of imaging lenses 10 is different from the inter-lens spacing between another pair. For example, S12 or the inter-lens spacing between L1 and L2, is different from S23 or the inter-lens spacing between L2 and L3. S12 and S23 are also different from S34 or the inter-lens spacing between L3 and L4. Likewise, S13 or the inter-lens spacing between L1 and L3 is different from S34, and is also different from S24 or the inter-lens spacing between L2 and L4. S14 or the inter-lens spacing between L1 and L4 is greater than each of the other inter-lens spacing. In an embodiment of the present invention, S12=10 mm, S23=15 mm, S34=20 mm, S13=S24=35 mm and S14=45 mm.

Figure 3:
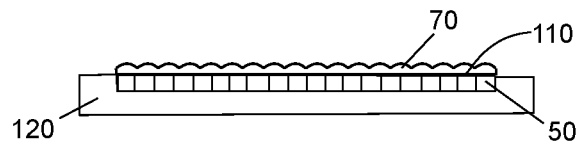
FIG. 3 shows a typical 3D display for displaying a 3D image.

When taking pictures, all the imaging lenses L1, L2, L3 and L4 are arranged to simultaneously form four images P1, P2, P3 and P4 of the same scenes on an image sensor device 20 (see FIG. 3). As shown in FIG. 1A, the camera 5 also has a ranging device, such as a laser 140, arranged to estimate the object distance between a photographed object (not shown) and the camera. Based on the object distance, the user of the camera can determine the images formed by which pair of imaging lenses among L1, L2, L3 and L4 will be used to produce a composite image to be displayed on the 3D display 120 (see FIG. 1C) for viewing. In an embodiment of the present invention, the focal length, or the focus, of the imaging lenses 10 is fixed. In another embodiment, the focal length can be adjusted based on the object distance.

Figure 1B:
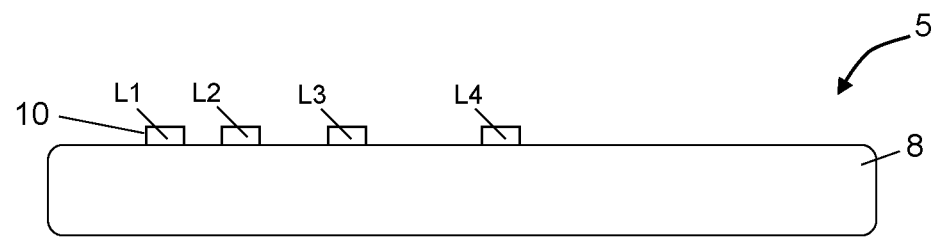
FIG. 1B shows the top view of the camera.

FIG. 1B is a schematic representation showing the top view of the camera 5 with four imaging lenses 10 disposed on the camera body 8.

Figure 1C:
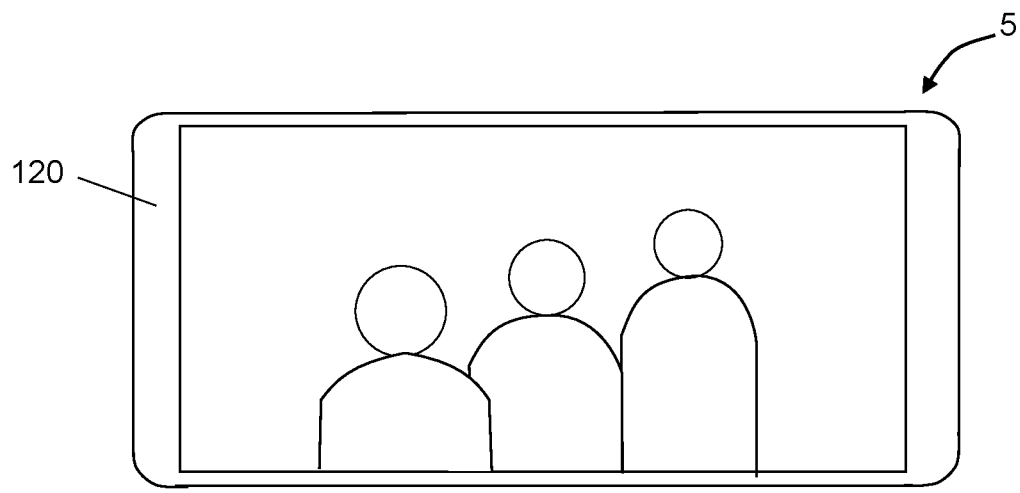
FIG. 1C shows the rear view of the camera.

FIG. 1C shows the rear view of the camera 5. As shown in FIG. 1C, the camera has a 3D display 120 arranged to show a 3D image.

Figure 2:
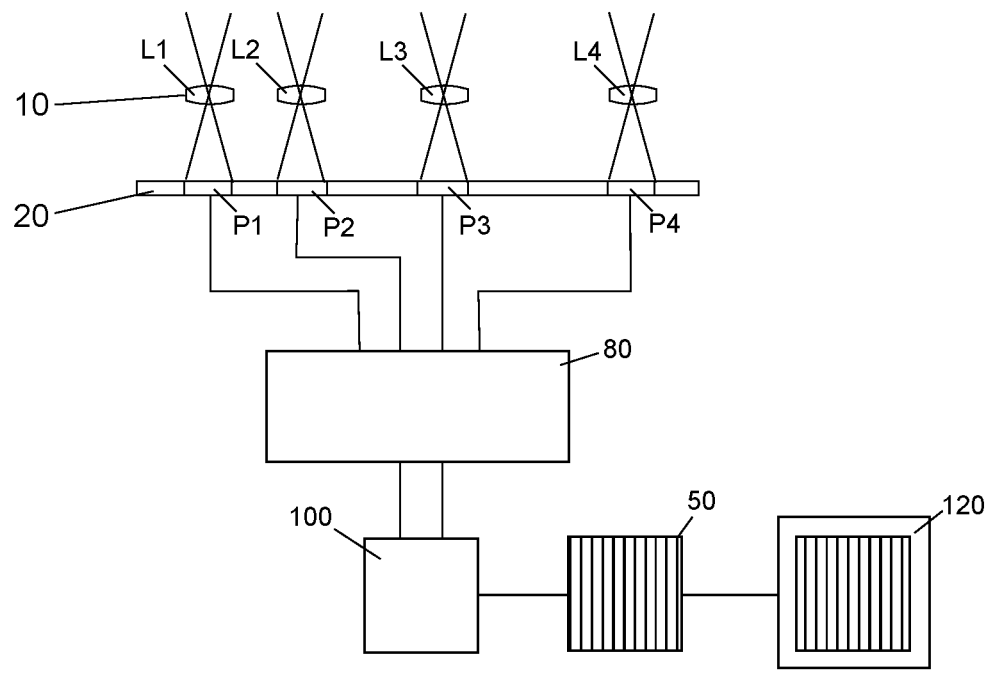
FIG. 2 shows various image forming components of the camera.

FIG. 2 shows various components related to the making of a 3D image in the camera 5. As shown, an imaging sensing device 20, such as one or more electronic sensors, is placed in the image plane of the imaging lenses L1, L2, L3 and L4 to capture four images P1, P2, P3 and P4. The imaging sensing device 20 can be a single sensor or four sensors, for example. An image selection device 80 is arranged to receive the images P1, P2, P3 and P4. The image selection device 80 allows a user to select which pair of images among P1, P2, P3 and P4 to be used for making a 3D image. The image selection device 80 is electronically connected to an image processor 100, which is arranged to compose a composite image 50 to be displayed on a 3D display 120 from the selected pair among P1, P2, P3 and P4. As it is known in the art, a composite image consists of image strips from a left image and image strips from a right image alternately arranged.

FIG. 3 shows a typical 3D display. As shown, the 3D display 120 has an image display device 110, such an LCD display or an OLED display, arranged to display a composite image 50. A parallax sheet 70, such as a lenticular screen or a parallax barrier, is placed on top of the image display device 110 to separate the left-image strips from the right-image strips for viewing.

Figure 4:
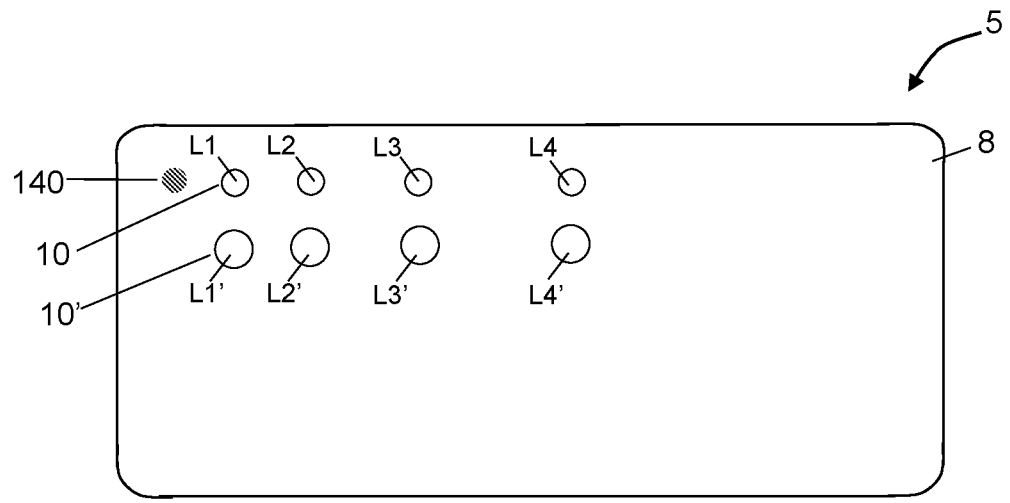
FIG. 4 shows a camera with more than one row of imaging lenses.

In an embodiment of the present invention, the camera 5 comprises two rows of imaging lenses, as shown in FIG. 4. One row of imaging lenses 10 includes imaging lens L1, L2, L3 and L4. Another row of imaging lenses 10' includes imaging lenses L1', L2', L3' and L4'. While the focal length of the imaging lenses is the same for the imaging lenses in the same row, the focal length of the imaging lenses in one row is different from the focal length in the other row. In one embodiment, the imaging lenses in one row are tele-lenses. For example, L1', L2', L3' and L4' are tele-lenses or long-focus lenses as compared to L1, L2, L3 and L4. In another embodiment, the imaging lenses in one row are close-up lenses with the varied inter-lens spacing smaller than the varied inter-lens spacing of the other row. For example, L1', L2', L3' and L4' are close-up lenses with focal length shorter than L1, L2, L3 and L4.

In an embodiment, the camera 5 comprises a row of N imaging lenses 10 and a row of M imaging lenses. An imaging sensing device arranged to capture N images and M images, each associated with a different one of the N and M imaging lenses. Each pair of the N imaging lenses is spaced from each other by an inter-lens spacing, and wherein the inter-lens spacing between one pair of the N imaging lenses is different from the inter-lens spacing between another pair of the N imaging lenses, and wherein N is a positive integer equal to or greater than 3. Each pair of the M imaging lenses is spaced from each other by an inter-lens spacing, and wherein the inter-lens spacing between one pair of the M imaging lenses is different from the inter-lens spacing between another pair of M imaging lenses and also different from the inter-lens spacing between any pair of the N imaging lenses, and wherein M is a positive integer equal to or greater than 3.

A row of imaging lenses in the camera 5 can have three imaging lenses, or four or five or more imaging lenses, with varied inter-lens spacing. The camera 5 can be a mobile device, such as a mobile phone. The camera 5 can be a standalone camera.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A camera, comprising:
N imaging lenses arranged in a row, and
an imaging sensing device arranged to capture N images, each associated with a different one of the N imaging lenses, wherein the N imaging lenses are spaced from each other to form (N−1) adjacent lens pairs, each of the (N−1) adjacent lens pairs has an inter-lens spacing therebetween, and wherein the inter-lens spacing between each one of the (N−1) adjacent lens pairs is different from the inter-lens spacing between another one of the (N−1) adjacent lens pairs, and wherein N is a positive integer equal to or greater than 3, wherein each of the imaging lenses has a focal length and the focal length of any one of the imaging lenses is equal to the focal length of another one of the imaging lenses, wherein the imaging sensing device comprises one imaging sensor for capturing the N images.

2. A camera, comprising:

N imaging lenses arranged in a row, and an imaging sensing device arranged to capture N images, each associated with a different one of the N imaging lenses, wherein the N imaging lenses are spaced from each other to form (N−1) adjacent lens pairs, each of the (N−1) adjacent lens pairs has an inter-lens spacing therebetween, and wherein the inter-lens spacing between each one of the (N−1) adjacent lens pairs is different from the inter-lens spacing between another one of the (N−1) adjacent lens pairs, and wherein N is a positive integer equal to or greater than 3, wherein each of the imaging lenses has a focal length and the focal length of any one of the imaging lenses is equal to the focal length of another one of the imaging lenses, said camera further comprising a selection device, electronically connected to the imaging sensing device, for selecting two of the N images associated with one of the (N−1) adjacent lens pairs, and an image processor arranged to compose a composite image from said two of the N images.

3. The camera according to claim 2, further comprising a three-dimensional display device electronically connected to the image processor arranged to display the composite image.

4. The camera according to claim 2, wherein the imaging lenses are fixed-focus lenses.

5. The camera according to claim 2, wherein the image lenses are focus-adjustable lenses.

6. The camera according to claim 2, further comprising a ranging device arranged to determine a distance of a photographed object, wherein each of the image lenses has an adjustable focus and the focus is adjusted based on the distance of the photographed object.

7. The camera according to claim 6, wherein the ranging device comprises a laser ranging device.

8. The camera according to claim 2, wherein the imaging sensing device comprises N imaging sensors.

9. The camera according to claim 1, further comprising

M imaging lenses arranged in a different row, wherein the imaging sensing device is also arranged to capture M images, each of the M images associated with a different one of the M imaging lenses, wherein the M imaging lenses are spaced from each other to form (M−1) adjacent lens pairs, each of the (M−1) adjacent lens pairs having an inter-lens spacing therebetween, and wherein the inter-lens spacing between each one of the (M−1) adjacent lens pairs is different from the inter-lens spacing between another one of the (M−1) adjacent lens pairs and also different from the inter-lens spacing between any one of the (N−1) adjacent lens pairs, and wherein M is a positive integer equal to or greater than 3.

10. The camera according to claim 1, comprises a mobile device.

11. The camera according to claim 1, comprises a stand-alone camera.

12. A method for producing a composite image in a camera, comprising:

providing a row of N imaging lenses on the camera, arranging an imaging sensing device arranged to capture N images, each associated with a different one of the N imaging lenses, wherein the N imaging lenses are spaced from each other to form (N−1) adjacent lens pairs, each of the (N−1) adjacent lens pairs having an inter-lens spacing therebetween, and wherein the inter-lens spacing between each one of the (N−1) adjacent lens pairs is different from the inter-lens spacing between another one of the (N−1) adjacent lens pairs, and wherein N is a positive integer equal to or greater than 3, and selecting two of the N images associated with one of the (N−1) adjacent lens pairs for producing the composite image based on the inter-lens spacing between said two of the N images.

* * * * *